United States Patent [19]

Boldt

[11] Patent Number: 4,712,054
[45] Date of Patent: Dec. 8, 1987

[54] CONTROLLER WITH TWO MODES OF BRAKING INDUCTION MOTORS

[75] Inventor: Robert R. Boldt, Taylor Ridge, Ill.

[73] Assignee: East Moline Metal Products Company, East Moline, Ill.

[21] Appl. No.: 863,068

[22] Filed: May 14, 1986

[51] Int. Cl.$^4$ .......................... H02P 3/20; H02P 5/40
[52] U.S. Cl. ................................... 318/758; 318/763; 318/809
[58] Field of Search ........................ 318/809, 758–764; 187/119, 120

[56] References Cited

U.S. PATENT DOCUMENTS

| | | | |
|---|---|---|---|
| 4,042,069 | 8/1977 | Ohira et al. | 187/119 |
| 4,207,508 | 6/1980 | Habisohn | 318/779 |
| 4,311,949 | 1/1982 | Pelkmann et al. | 318/799 |
| 4,319,665 | 3/1982 | Komuro et al. | 187/119 |
| 4,355,704 | 10/1982 | Makinen | 187/119 |
| 4,483,419 | 11/1984 | Salihi et al. | 187/119 |
| 4,501,343 | 2/1985 | Salihi | 187/119 |
| 4,503,937 | 3/1985 | Cevenec et al. | 187/119 |

Primary Examiner—David Smith, Jr.
Attorney, Agent, or Firm—Glenn H. Antrim

[57] ABSTRACT

To a controller utilizing thyristors have been added delayed resetting circuits connected to timing circuits for enabling delayed firing, and also circuits for inverting polarity of error signal in order to accommodate regenerative and reverse-plug braking. Other additional circuits include circuits for controlling a ramp generator for developing different segments of a ramp required for different modes of operation of a motor. Sequence switching circuits in the circuits controlling operation of the motor determine that full acceleration or deceleration of a selected mode is completed before a newly selected mode is started. For smooth starting and stopping of elevators, a curve-shaping circuit succeeding the ramp generator gradually changes the slope at the very ends of a selected segment of the ramp, and a brake control circuit having an input connected to the motor and output switching circuits for controlling disconnection of the motor and application of holding brakes, synchronizes disconnection of the motor and application of mechanical brakes when the motor ceases rotation.

3 Claims, 5 Drawing Figures

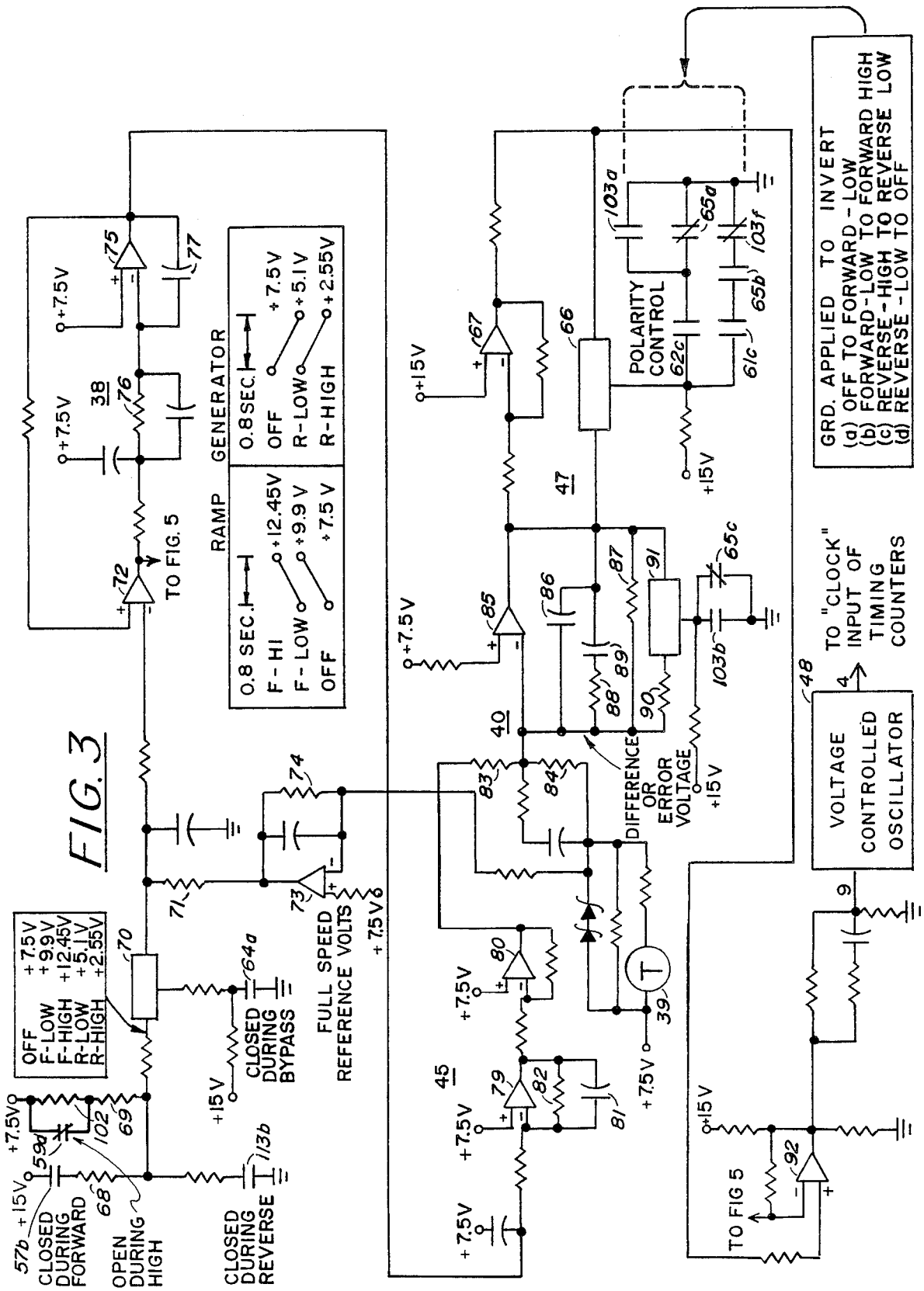

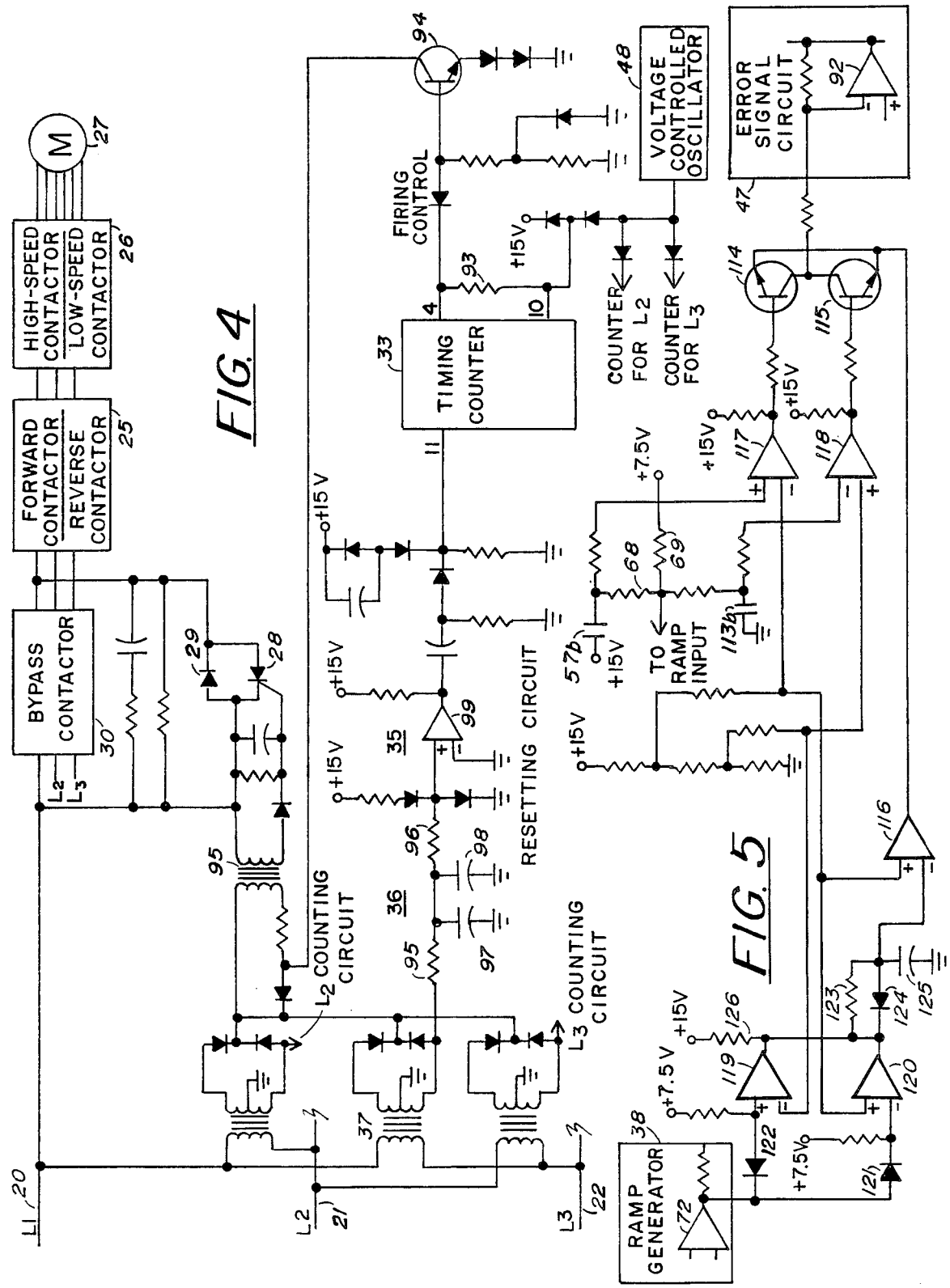

4,712,054

CONTROLLER WITH TWO MODES OF BRAKING INDUCTION MOTORS

BACKGROUND OF THE INVENTION

This invention pertains to controllers utilizing reference generators and tachometers for controlling acceleration and speed of induction motors, and particularly to systems for controlling not only acceleration and speed but also for controlling stopping of motors and loads by induction.

The present controller like prior controllers utilizes thyristors, reference or ramp generators, and tachometers to control rate of acceleration and speed of three-phase induction motors. In a typical three-phase, 240-volt system, each conductor of a three-phase line is connected through a respective thyristor and diode to the winding of an induction motor. Firing circuits for determining conductive intervals of the thyristors are controlled by an error signal from an output of a comparator. Inputs to the comparator include a voltage proportional to speed derived from a tachometer connected to the motor and a voltage having a predetermined rate of change derived from a reference generator. The reference generator is known as a ramp generator for a curve of its output voltage or ramp is substantially linear with a predetermined slope determining acceleration. The motor is accelerated at a rate such that the output from the tachometer to the comparator is maintained substantially equal to the instantaneous voltage of the ramp.

Since in many applications of motors having controlled acceleration, controlled deceleration is not required, motors and loads coast to a stop at a rate determined by friction. In other applications for operating such devices as passenger elevators, deceleration and stopping must be smoothly controlled. Mechanical brakes are often used even though large amounts of energy dissipated by the brakes result in undesirable amounts of wear.

Multi-speed, three-phase, induction motors have been used for electromagnetic braking by changing connections to windings in two different ways. To provide braking from high speed operation to low speed operation, the conductors of a supply line to windings are merely changed to low speed operation, and the motor functions as a generator to provide braking. However, current flow during this regenerative braking must be controlled to prevent excessive current and a high rate of deceleration. For stopping the motor and its load, two connections to the windings are interchanged so that the rotor of the motor is urged in a reverse direction. The result of this interchange is called plug-reverse braking and because it is very effective requires current control to prevent abrupt stopping and also to prevent damaging high surges of current.

During plug-reverse braking, the phase of lagging current in the winding of the motor is nearly 90 degrees in an adjacent quadrant with respect to the phase of voltage applied to the winding. During this period of lagging current while the motor is functioning as a generator, the thyristor for the particular line continues firing for a substantial period after the zero crossings of the applied voltage would ordinarily, when current is in phase, have reversed the polarity on the terminals of the thyristor to stop firing. Even though the firing of a thyristor is started only shortly before the zero crossing, the amount of lagging current in the winding is excessive and causes elevators to stop abruptly in a manner known as jerking. Also when using plug-reverse braking, current must be controlled accurately to prevent overheating the motors.

When motors to be controlled have high starting torque and the starting current lags nearly 90 degrees, severe jerking while starting can be experienced. The present delayed firing is very effective to provide gradual starting.

SUMMARY OF THE INVENTION

In addition to using thyristors controlled by ramps for determining rates of acceleration, the present control utilizes control circuits for controlling smoothly starting and plug-reverse braking. In elevators using controllers according to the present invention, the motors can be used to slow elevators smoothly to a stop, and therefore mechanical brakes need to be used only for holding and in event of failure for emergency braking.

A main feature of this invention is the use of delay circuits in the resetting circuits of the thyristors. The delay in starting makes possible delay in firing for applying braking gradually and for providing moderate operating current. The maximum controlled current is low enough to prevent tripping circuit breakers or blowing fuses and to maintain temperature of motors within specifications. If the thyristors were to be reset in the usual manner only at zero crossings of the applied voltages, necessary control of current for smooth plug-reverse braking could not be obtained. In the prior circuits, firing of thyristors for short intervals after the zero crossings could not be obtained because resetting of the firing timing circuits soon after delayed firing was not provided. The zero crossings to which references are made herein are at the end of one-half cycles when respective thyristors would become non-conductive if the controlled load appears to be substantially resistive. During plug-reverse braking, the lagging current from motor windings prevents at the end of the half-cycles reversal of polarity across thyristors, and conduction during and after these zero crossings may continue substantially for subsequent respective quadrants of cycles.

According to the present invention, firing may be delayed until after zero crossings; the thyristors may not start to fire until current in a subsequent quadrant is lagging and cease to fire during each cycle only when lagging current has diminished until polarity is reversed across the thyristors. The delayed resetting and firing to ensure shortened conductive periods are particularly necessary at the starting of operation and at the termination of plug-reverse braking for stopping in order to prevent severe jerking.

In a preferred embodiment, resetting timing circuits are counters, and phase-shift or delay circuits are connected between supply lines and resetting circuits of the counters. A phase shift of approximately 85 degrees is obtained by the connection of transformers to the supply line and by resistive-capacitive circuits that complete the phase shift circuits.

Another feature of the invention is in ramp control means to provide required segments of a ramp, each segment being used for controlling either acceleration to a next selected high speed or deceleration to a successive lower speed or stop. In a preferred embodiment having two speeds, a voltage divider circuit provides starting and ending voltages required for four different segments, the voltages selected from the divider circuit being applied to a slow-operating feed-back amplifier circuit that functions as a reference or ramp generator. After the motor is operating, starting voltages of the segments are also developed in a circuit that includes a d-c tachometer connected to a controlled motor. During constant speed of the motor while control by the thyristors and the reference generator is bypassed, the tachometer continually develops a reference voltage corresponding to the speed of the motor, and the reference voltage is available to begin smoothly subsequent change of selected speed when commanded by a segment of the ramp.

Error-polarity inverting means connected between an operational switching control circuit and an error amplifying circuit is still another feature of this invention. During both regenerative braking and plug-reverse braking, the polarity of the error signal is inverted in comparison with the polarity during acceleration. When decelerating this inverted signal is then of the proper polarity to apply less current to the motor and therefore less braking in response to the speed being slightly too slow rather than the polarity calling for more current as required for greater acceleration.

Sequence holding circuits are also provided to ensure that control circuits in response to early manual or automatic selection do not switch to circuits commanding motors to accelerate to a next higher speed before being fully accelerated to the presently commanded speed. Also the sequence holding circuits must ensure that regenerative braking is completed before commanding plug-reverse braking. The sequence controlling circuits comprise a series of timing circuits connected between operational switching control circuits and contactors for controlling the motors.

Preferably, a curve-shaping circuit is connected between the reference generator and the error-signal circuits that command the firing timing circuits. The curve-shaping circuit has a resistive-capacitive delay circuit that rounds the beginning and the final ends of the segments of the ramp so as to change acceleration or deceleration gradually when transferring from control by thyristors. The curve-shaping circuit in cooperation with transitional switching circuits for changing from plug-reverse braking to mechanical braking is particularly important to ensure a smooth stop.

BRIEF DESCRIPTION OF THE DRAWING

FIG. 3 is a schematic diagram of a reference generator and error signal circuits for controlling firing timing circuits;

FIG. 4 is a schematic diagram of typical thyristor controlling circuits, firing circuits, a timing counter controlled by circuits of FIG. 3 for controlling the firing circuits, and delayed resetting circuits of this invention for the counter; and FIG. 5 is a schematic diagram of a full-on circuit that may be connected between the ramp generator and the error signal circuit, the full-on circuit being recommended in controllers for elevators to ensure that the thyristors are fully conductive shortly after the termination of a segment of ramp commanding a selected speed.

DESCRIPTION OF A PREFERRED EMBODIMENT

Figure 1:
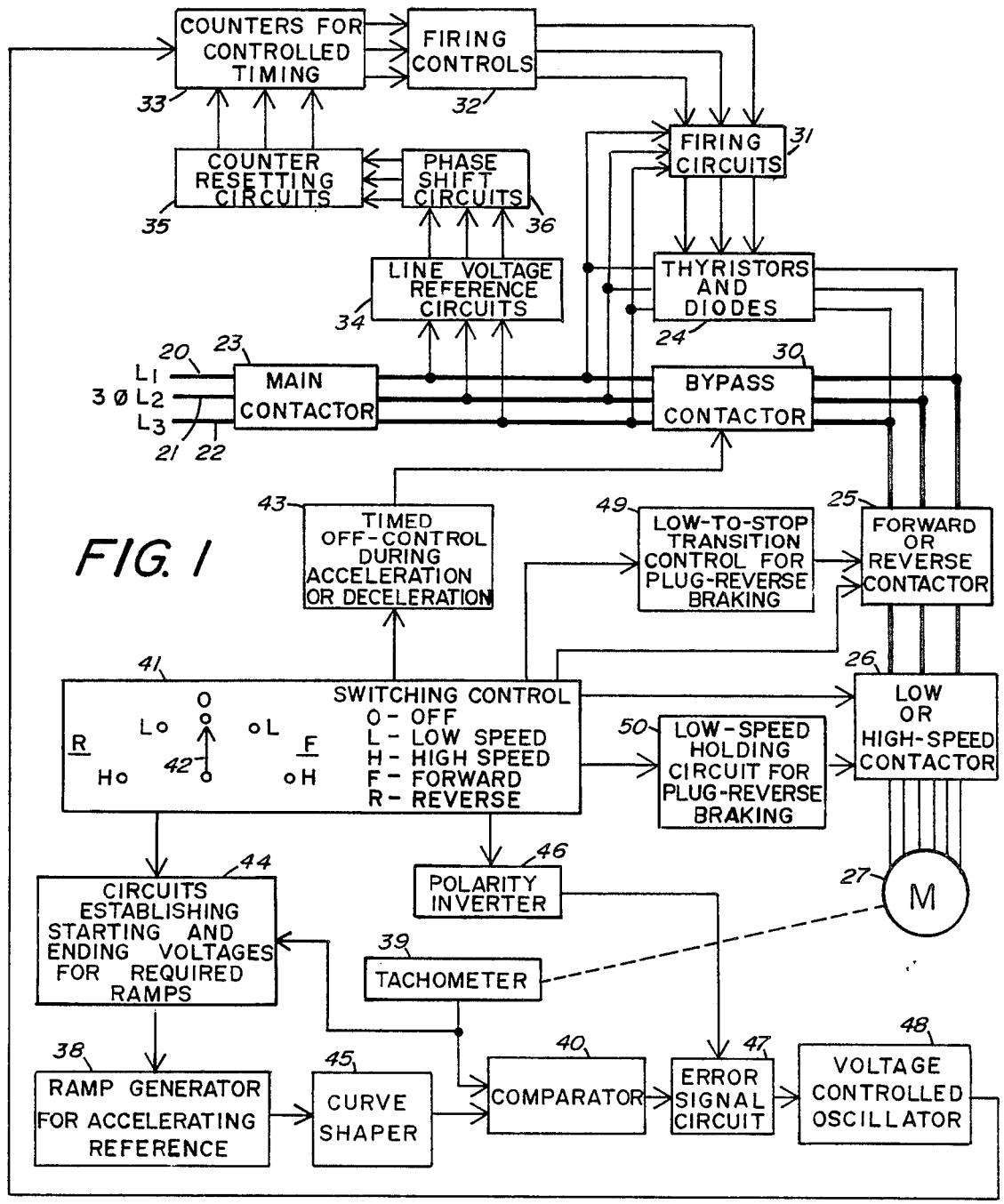
FIG. 1 is a block diagram of a preferred embodiment of the invention.

The new circuits for controlling braking by motors can be more readily understood after first noting in the drawing conventional circuits previously used for controlling acceleration. In FIGS. 1 and 4, the lines 20, 21, and 22 are the usual 480-volt 3-phase lines L1, L2, and L3 having phases 1, 2, and 3 respectively. The conductors of the lines 20–22 are connected through a usual main contactor 23, diodes and thyristors 24, phase-switching means or forward or reverse contactor 25, low or high-speed contactor 26 to the winding of motor 27. For simplification, in FIG. 4, the usual 3 sets of thyristors and diodes 24 of FIG. 1 are represented only by a thyristor 28 and a parallel diode 29 connected in the line 20. Also, similar circuits for controlling the omitted thyristors are omitted.

In the present controller, a by-pass contactor 30 is preferably shunted across the thyristors and diodes 24. The contactor 30 has a pair of contacts connected across each parallel diode and thyristor as indicated in FIG. 4 across the diode 29 and the thyristor 28. In general as shown in FIG. 1, prior circuits have firing circuits 31 connected to the thyristors and diodes 24, and have firing controls 32 responsive to a firing timing circuit for operating the firing circuits 31. The firing timing circuits in the present embodiment are three counters represented by a counter 33 operated as described in detail below. Also, line voltage reference circuits 34 are customarily connected between the line 20–22 through resetting circuits represented as counter resetting circuits 35.

As described below, phase-shift or time-delay circuits 36 shown connected between the line voltage reference circuits 34 and the resetting circuits 35 are important features of this invention. The phase shift circuits for phase 1 as shown in FIG. 4 comprise a transformer 37 and resistors and capacitors connected thereto. The counter 33 used herein for controlling the firing timing circuit of line 20 is controlled in general like prior timing circuits from a ramp generator 38, and a tachometer 39, the generator and tachometer being connected to a comparator 40 for developing an error signal for application to a firing timing circuit corresponding to the counter 33.

Figure 2:
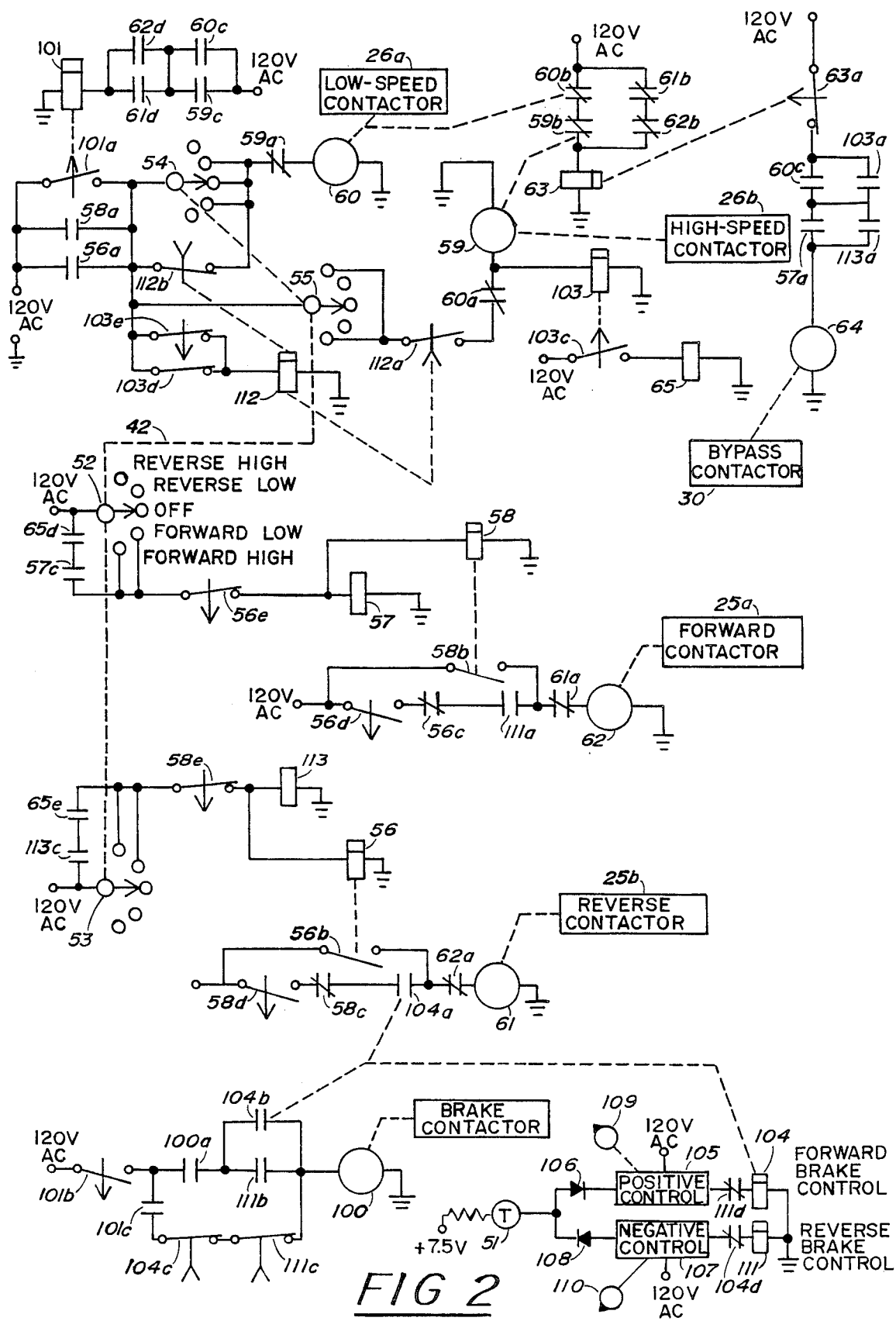
FIG. 2 is a schematic diagram of typical operational switching controls of a controller according to the present invention.

The switching control circuits 41 of FIG. 1 for the present embodiment are shown schematically in FIG. 2. This control contains commercially available switches, relays, and contactors connected as required for controlling the conventional circuits as described in general above as well as the new circuits to be described in detail below. The switching control circuit as shown in FIG. 2 is especially applicable to manual operation of motors connected to elevators. When desired, the devices as shown in FIG. 2 may be replaced by a programmable switching assembly to provide additional automation and flexibility.

The operation of the delay means or phase shift circuits 36, firing resetting circuits 35, and several additional new circuits required for successive regenerative and plug-reverse braking can be more easily understood from a brief description of the operation according to the block diagram of FIG. 1. For simplicity, detailed switching control circuits and circuits controlling operation of mechanical brakes are omitted in FIG. 1. Initially, assume that the main contactor 23 is closed, and the switching control 41 is operated to OFF. The bypass contactor 30 is open to prepare control of motor 27 by the thyristors and diodes 24. In response to the operation of a selective operational switching control 42 of the switching control 41 from OFF to forward-low, bypass time delay switching means 43 to provide timed off-control during acceleration or deceleration is energized to start timing for operating the bypass contactor 30 after a predetermined interval, for example, 0.8 second. The selection of forward-low also controls ramp control means 44 for establishing starting and ending voltages for a required ramp, the selected required ramp controlling the acceleration of motor 27 from OFF to low speed. Circuits 44 comprise voltage divider means for developing required starting and ending voltages and switching means for applying the voltages required for a particular mode of operation. The circuits 44 may also be referred to as slope control means for determining rate of acceleration.

The switching control circuits 41 operate the contractor 26 for low speed and a contactor 25 (a phase switching means) for forward direction to start acceleration of the motor 27 at a rate commanded by the ramp of the reference generator 38. Over most of the ramp, the slope is substantially constant but the ends of the ramp are curved gradually by a curve shaper or curve shaping amplifier 45 connected between the reference generator 38 and the comparator 40. The short interval during gradual change in slope of the ramp ensures smooth starting of the motor 27.

At the time that the motor 27 was connected, an error polarity inverting means shown as polarity inverter 46 connected between the switching control 41, and an error signal circuit 47 was operated in one of its two modes of operation for controlling the polarity of error signal as required for controlling the acceleration of the motor 27 in its particular mode of operation. In this particular embodiment, the error polarity inverting means 46 applies ground for operating a circuit for preventing short-circuiting of an amplifier stage such that inverting is obtained. As described below, inverting is required during control of forward acceleration and is not required for reverse acceleration. However, when the motor 27 is being stopped by-plug reverse braking, windings of the motor 27 are connected for reverse operation even though the motor is still operating forward, therefore, during the reverse-plug operation, ground is not applied by the polarity inverter 46 and the controlled stage in the error signal circuit 47 does not invert. Also as a result of change of phase in the windings of the motor 27, inversion is not required during regenerative braking.

In a typical example, the ramp from the reference generator 38 controls acceleration of the motor 27 for 0.6 second until full low-speed operation is obtained. The curve at the upper end of the ramp resulting from the operation of the curve-shaping amplifier 45 ensures smooth transition from constant acceleration to zero acceleration at full selected speed. In the present embodiment in which the thyristors and the diodes are bypassed, the timing circuit 43 for the bypass contactor 30 causes the bypass contactor to close about 0.2 seconds after the termination of the controlling ramp. The ramp controlling means includes the tachometer 39, and in response to operation of the bypass contactor 30, the slope control means 44 is operated to disconnect voltages from the voltage divider means and for permitting direct-current voltage output from the tachometer 39 to control the voltage applied to the ramp generator 38.

Therefore, while the thyristor control circuits are bypassed, the voltage for the ramp is maintained at an optimum value determined by the speed of the motor 27 and does not depart far from the last ending voltage to become the beginning voltage for the subsequent mode of operation. This control of the new beginning voltage ensures smooth start of acceleration regardless of moderate variation in speed of the motor 27 resulting from various amounts of loading.

Timing of intervals before starting firing of the thyristors 24 is provided by the counters 33, and delayed resetting of the counters 33 is provided by voltages derived from the lines 20–22 and applied through the line voltage reference circuits 34, the phase shift or delay circuits 36, and the counter resetting circuits 35. The frequency of signal applied to the respective "clock" inputs of the counters 33 determines intervals preceding firing. The interval in any cycle during which firing is suppressed is somewhat longer than a usual interval equal to approximately one-half the period of a full cycle. For example, the full count of the counters 33 may be 64 counts, and the frequency of the voltage controlled oscillator 48 may be varied between about 3,840 Hz for maximum periods of firing (maximum counting time before firing) and about 9,600 Hz for minimum periods of firing.

In the present controller for operating elevators smoothly, the periods of firing are delayed in comparison with the usual periods coinsiding with one-half cycles of line voltage beginning one-half cycle after the resetting of timing means. The delay in starting firing is required for smooth control of elevators to prevent jerking when the phase of current in the windings of motors is lagging the phase of line voltage, namely when starting the motors and when completing plug-reverse braking. In these instances, the amount of lagging current in the quadrants succeeding the usual one-half cycles of line voltage during which control is usually effective, is sufficient to cause too much acceleration during starting and too much braking as an elevator is stopped by-plug reverse braking. For example, even though firing is merely a pulse at the very end of the usual one-half firing cycles, too much torque is developed during the duration of lagging current while polarity across the electrodes of thyristors still maintain conduction.

Specifically with reference to FIG. 4, one of the usual three thyristors is represented by a thyristor 28 connected to a respective line 20 of a three-phase source. Timing the resetting of the firing circuit and consequently the firing angle of the thyristor 28 is with reference to zero crossings of voltage having phase 1 as applied from the line 20 to the thyristor 28 and the parallel diode 29. The term zero crossing as used herein with respect to resetting of the firing circuit refers to the zero voltage when the polarity of the line 20 changes from negative to positive. During the one-half cycles that follow the respective negative-to-positive zero crossings and providing current being controlled is in phase with the voltage, current flows through the diode 29 while at least one of the thyristors in lines 21 and 22 is conductive, and therefore the polarity of the voltage applied across the electrodes of the thyristor 28 prevents conduction therethrough during the entire duration of these one-half cycles. Also at the beginning of the same one-half cycles, timing is started with reference to the respective negative-to-positive zero crossings to determine the firing time or firing angle of conduction, if any, of the thyristor 28 during the following one-half cycles. As usual, when voltage and current are in phase, polarity across the electrodes of the thyristor 28 permits conduction in response to firing only during the one-half cycles preceding and not during the one-half cycles following the negative-to-positive zero crossings.

The operation of the conventional circuit as just described fails to control starting and stopping of a loaded motor smoothly when the phases of the current required by the motor 27 for acceleration or for deceleration substantially lags the phases of the voltages of the respective lines 20–22. In prior circuits wherein the resetting of the firing timing circuits 31 occurs at the respective negative-to-positive or reference zero crossings, firing is terminated at the time of the zero crossings and is not to be started effectively until the succeeding zero crossings. But when an elevator is being stopped by plug-reverse braking, or is being started, the phase of the current is lagging the phase of the voltage such that polarity across the thyristor for conduction is retained, by counter electromotive force, during most of a quadrant succeeding the usual reference zero crossing. As stated above, when usual firing timing or firing angle is terminated at the usual reference zero crossings and even though the last possible firing pulse during a usually conductive one-half cycle starts the thyristor to conduct, the counter voltage generated in the usually nonconductive one-half cycles will continue to retain the thyristor conductive long enough to provide sufficient current and therefore sufficient torque during starting and stopping to cause jerking.

A timing range for firing of 216 degrees proved to be satisfactory providing the delay circuits 36 delayed resetting nearly 90 degrees, for example, 85 degrees. The delay circuits 36 may also be described as being phase-shift circuits that shifts the phase of a reference signal by 85 degrees to provide lagging reference zero-crossings for controlling resetting of the timing counter 33. Then the usual range of timing described above changes from very short periods of firing in succeeding quadrants when current is lagging to maximum periods of about 135 degrees of firing when current is in phase. Earlier firing when current is substantially in phase is unnecessary because motors have usually attained full-speed when firing is started somewhat later than the occurence of zero crossings at the beginning of those half cycles during which firing normally occurs when current is in phase. Usually, current lags, for example by 30 degrees, at full speed. The present firing circuits provide continuous and smooth control from times of later firing to provide a relatively small amount of lagging current through times of earlier firing to provide adequate current for full selected speed. As described below, circuits may be included for ensuring full selected speed of the motor 27 immediately after the termination of a segment of the ramp commanding acceleration.

Should the selective operational switching control 42 be operated from forward-low to forward-high before the motor 27 has obtained full low speed, timed contacts continue operation of the low-speed circuits and then automatically switch to high-speed circuits at the end of the usual bypassed period. When high-speed is selected after the motor is energized through the bypass contactor 30, the contactor 26 is changed immediately from low speed to high speed, ground is still applied to the polarity inverter 46, and the required ramp voltage as shown in FIG. 3 for forward-low to forward-high is applied to the ramp generator 38. In FIG. 3, four segments required for the controlling ramp are shown. In response to each selection of speed, the appropriate segment is selected. In the present embodiment for operating an elevator, the tachometer 39 is supplying during low-speed operation a starting voltage of approximately 9.9 volts, and the selection of high-speed operates switching circuits for applying 12.45 volts to the input of the ramp generator 38. The contactor 25 for forward direction releases only momentarily as described in detail below to start again the timing of the bypass timing circuits 43. The bypass contactor 30 is therefore open to begin the 0.8-second timing period during which the ramp generator 38 and the tachometer 39 control acceleration of the motor 27 to high speed.

In response to the selection of low speed, a segment of the ramp ending in approximately 9.9 volts is selected to provide a commanding voltage changing from plus 12.45 volts to 9.9 volts. The polarity inverter 46 does not apply ground and an inverting stage in the error signal circuit 47 is bypassed; the forward contactor 25 is again operated; and the contactor 26 is changed from low speed to high speed. The operation of the contactor 26 again starts timing to open the bypass contactor 30 for approximately 0.8 second. The curve shaper 45 is effective to start applying the decreasing voltage from the ramp generator gradually, and at this time the frequency of the signal developed by the voltage-controlled oscillator 48 is toward the low end of its range to provide a long counting time by the counters 33. Timed circuits are employed to ensure the period for regenerative-braking mode will be completed regardless of immediate reoperation of the selective operational switching control 42.

When the control 42 is operated from the forward-low position to OFF, transitional timing circuits 49 connected from the switching control 41 to the forward and reverse contactors 25 and also timing or holding circuits 50 connected from the switching control to the selective speed contactor 26 are effective. The transitional circuits 49 switch phase to the windings of the motor 27 as if to reverse the motor, and the holding circuits 50 maintain the low-speed windings connected for operation. Therefore, when the switch 42 is operated to OFF, the contactor 25 is operated from forward to reverse, and the timing circuits 43 controlling the bypass contactors 30 are effective for again starting the period for controlled operation by the thyristors 24. Through operation of a timed relay and the reverse contactor 25, the operation of the polarity inverter 46 is changed to change polarity of the error signal in the circuit 47. As stated above, this change in polarity is necessary because now the increase of operating current to the motor 27 causes deceleration rather than acceleration. The voltage of a selected ramp changes from 9.9 volts to 7.5 volts, the motor coming to a stop when 7.5 volts is reached. As described in detail below, sensing of zero velocity by a tachometer 51 shown at the bottom of FIG. 2 deenergized the contactor 25 to prevent reversing of the motor 27.

The detailed operation of a suitable control circuit may be understood with reference to FIG. 2 that shows a manually operated control system for operating an elevator. When the system is applied to an elevator, forward operation of the motor 27 raises the elevator and the reverse direction lowers the elevator. A manually operated switch or contactor designated a selective operational switching control 42 is simply shown as a four-section selective switch, each section having five positions for forward-high, forward-low, OFF, reverse-low, and reverse-high. Sections 52 and 53 mainly control forward and reverse directions of operation respectively, and sections 54 and 55 control contactors for low and high speeds respectively. All the switches and contactors are operated by applying 120 a-c volts with respect to ground through contacts to a terminal of their respective windings, the other terminal of each winding being grounded.

When an operator of an elevator operates the selective switch 52 from OFF to forward-low (up-slow), a circuit is completed through normally close contacts 56e to energize both forward relay 57 and forward delay relay 58. The circuit for operating the low-speed contactor 26a includes operated contacts 58a of the forward delay relay 58, switch section 54, normally close contacts 59a and winding 60 of the low speed contactor. Although certain contacts of the forward delay relay 58 have delayed operation, the contacts 58a are closed immediately upon energization and are opened immediately upon deenergization. Contacts of all the relays are quick acting unless otherwise noted. Although for simplicity most of the contacts are shown detached from their operating windings, dashed connecting lines are used where feasible to aid correlation. Although the symbols for the relays are uniformly shown as the conventional symbols for electromagnetic relays, commercial relays depending upon digital or photoelectric circuits for delayed operation of contacts are used where required. Forward delay relay 58 also closes contacts 58b for completing a circuit through normally closed contacts 61a and the winding 62 of the forward contactor 25a. When each of the contactors 26a, 26b, 25a, and 25b operates, it opens contacts for disabling the operating circuit of the contactor that performs an opposite function. The operation of the forward contactor 25a in response to energization of its winding 62 opens contacts 62a in the circuit of the winding for reverse contactor 25b, and likewise the operation of the low-speed contactor 26a in response to the energization of its winding 60 opens contacts 60a in series with the windings 59 of the high-speed contactor 26b.

In addition to the energization of contactor windings 60 and 62 for operating the motor 27, other contacts are operated substantially simultaneously for determining a required segment of a ramp to be developed by the ramp generator 38, and a timed contact is opened to release the bypass contactor 30. Also for this mode of operation, contacts are operated to prevent short circuiting of the inverting amplifier stage in the error signal circuit 47. Specifically, a bypass control relay 63, a component of the timed off-control 43 of FIG. 1, is normally energized until the low-speed contactor 60 and the forward contactor 62 are operated to open contacts 60b and 62b in the operating circuit of the relay 63. The opening of these contacts opens the circuit of the relay 63 to permit timed contacts 63a to open and remain open for 0.8 second. At the end of 0.8 second, the contacts 63a close again and remain closed until relay 63 is subsequently deenergized when a different mode of operation is selected. The opening of the contacts 63a opens the circuit of the winding 64 of the bypass contactor 30 for releasing the contactor to permit control of current to the windings of the motor 27 by the thyristors as represented by the thyristor 28.

During 0.8 second while contacts 63a are open and the ramp is commanding a predetermined rate of acceleration, relays are operated to determine the ending voltage of the ramp and polarity of error signal controlling the ramp. Referring to the circuit of the error signal circuit 47 in FIG. 3, when the forward contactor 62 operated, contacts 62c were closed to ground the control circuit of a field-effect-transistor gate 66. The gate opens to remove a shunt from across an operational inverting amplifier 67 in the error signal circuit 47 for controlling the ramp. In the voltage controlling circuits for the ramp generator 38 (FIG. 3), the operation of the forward relay 57 closes contacts 57b (FIG. 3) for completing a circuit from a 15-volt terminal through the resistors 68 and 69 and through normally closed contacts 59d to a 7.5-volt terminal. Resistors 68 and 69 function as a voltage divider to apply from the junction thereof positive 9.9 volts through FET gate 70 to the input of the ramp generator 38.

During bypass when the thyristors are short-circuited, contacts 64a controlled by the winding 64 of the bypass contactor 30 are closed to open the gate 70 for permitting beginning voltage to be applied through a 100 K resistor 71 and a series isolation resistor to the negative input of an operational amplifier 72 at the input of the ramp generator 38. The direct-current tachometer 39 connected to the motor 27 has one side of its winding connected to positive 7.5 volts, 7.5 volts being a reference for zero speed. The opposite terminal of the tachometer is connected through a suitable voltage divider to provide a desired voltage to the negative input of an operational amplifier 73 functioning as a differential amplifier. The positive input of the amplifier 73 is connected through a usual isolating resistor to plus 7.5 volts. The usual 10K resistor 74 is connected between the negative input and the output of the amplifier 73 so that the output voltage applied to the input of the ramp stage 72 is equal to the voltage applied to the amplifier 73 from the resistor that is connected to the tachometer 39.

Values of the resistors of the voltage divider including the resistors 68 and 69 and the values of the resistors in the network connected to the tachometer 39 are selected so that the ending voltage from the junction of the resistors 68 and 69 equals the voltage for a selected full speed of the motor 27 as applied from the resistive network connected to the tachometer 39. For example, if the speed of the motor 27 for a particular load is expected to be about 1,750 rpm, then the output of the amplifier 73 applied to the input of the ramp generator 38 at this speed is positive 9.9 volts and likewise the output of the voltage divider to be applied through the FET gate 70 for determining the ending voltages is positive 9.9 volts. Summarizing, in response to operation from OFF to low speed, the contacts 64a of the bypass contactor 30 are opened to apply for ending voltage, positive 9.9 volts from the resistors 68 and 69 to the negative input of the operational amplifier 72. Because of the high resistance of the resistor 71 in the output circuit of the amplifier 73, the voltage as controlled by the tachometer 39 is no longer effective until the contacts 64a are closed while the thyristors are bypassed.

The application the ending voltage to the input of the ramp or reference generator 38 provides a ramp voltage that rises at substantially a constant slope from 7.5 volts to 9.9 volts in about 0.6 second. The reference generator 38 has two operational amplifiers stages 72 and 75 having a conventional 10K feed-back resistor connected from the output of the second amplifier 75 to the positive input of the first amplifier 72. As a result of the feedback circuit, the output of the amplifier 75 tends to become substantially equal to the input applied from the voltage divider to the negative input of the amplifier 72. The time for the output to become equal to the input of the amplifier 72 is delayed to provide the constant slope of the different segments of the ramp used for changing to different speeds. The slope is determined by the value of a resistor 76 connected between the output of the amplifier 72 and the negative input of the amplifier 75 and by a capacitor 77 connected between the negative input of the amplifier 75 and its output. In this embodiment for controlling an elevator having a 1800 and 3600-rpm motor, the value of resistor 76 is 1.0 megohm, and the value of the capacitor 77 is 1.0 microfarad.

The curve shaper or curve-shaping amplifier 45 comprises amplifier stages 79 and 80 in series connected between the output of the reference generator 38 and the input of the error signal circuit 47. The rounding of the ends of the segments of the ramp is the result of a short delay provided by a capacitor 81, typically 4.7 microfared, and a resistor 82, typically 10K ohms, connected across the negative input and the output of the amplifier 79. Since the reference value for zero speed is plus 7.5 volts, the positive inputs of the amplifiers 79 and 80 are biased at that voltage.

Shaped ramp voltage is applied through a resistor 83 to the negative input of a differential amplifier 85 in the error signal circuit 47, and voltage from the voltage divider that is connected to the tachometer 39 is applied through a resistor 84 to the same input to complete a summing circuit and is herein considered as part of the comparison means 40 functioning as usual comparators used in motor control circuits. A difference between the voltages applied from the wave shaping amplifier 45 and the voltage applied from the divider of the tachometer 39 is applied to the negative input of the amplifier 85 for operating the amplifier with reference to the 7.5 volt bias applied to its positive input. In this particular embodiment, the gain and response of the amplifier 85 are controlled by a capacitor 86, a resistor 87, and a series resistor 88 and a capacitor 89 connected between the negative input and the output of the amplifier. The capacitor 86 has a value of 0.01 microfarad, the resistor 87, 470K ohms, the capacitor 89, 1.0 microfarad; and the resistor 88 has a value of 100K ohms. During certain modes of operation, an additional 68K-ohm resistor 90 is also connected in parallel with the amplifier 85 through an FET gate 91 in order to stabilize the operation of the amplifier 85.

The inverting stage 67 is a second of three inverting stages in the error circuit 47, and is the stage controlled to determine polarity of error signals. The gate 66, its biasing circuit, and series and parallel contacts of control relays for short-circuiting the bias circuit to ground comprise a polarity switching means. During modes of operation listed below the biasing circuit in FIG. 3, at least two of these contacts are operated in series to close the gate 66. The closing of the gate 66 short-circuits the inverting stage 67; then the error signal in the error circuits 47 is inverted twice rather than three times, like during the remaining modes while the control circuit is not grounded. Continuing the description of the mode of operation in response to selection of low-speed, normally closed contacts 65a of the high delay relay 65 remains closed and contacts 62c operated by the winding 62 of the forward contactor completes the ground circuit to open the gate 66 and thereby to permit the amplifier 67 to invert.

A voltage-controlled oscillator 48 receives error signal of controlled polarity through the final inverting amplifier 92. As described below, in applications requiring special precautions to insure smooth operation at all times, bias for the amplifier 92 may be controlled by a full-on control circuit shown in FIG. 5. A type 4046B integrated circuit functioning as a typical voltage-controlled oscillator has an input 9 connected to the output of the error signal circuit 47 and a controlled frequency output 4 connected to a "clock" terminal 10 of a type 4040B integrated circuit, a 64-count binary counter. As shown in FIG. 4, the output of the voltage controlled oscillator 48 is also connected through a resistor 93 from the clock input terminal 10 of the timing counter 33 to its output terminal 4 and also to the controlling base of a switching transistor 94.

Resetting voltage applied to terminal 11 of the counter 33 as described above is delayed about 85 degrees after the zero crossing that usually times the setting. Between the time that the counter 33 is reset and the counter reaches its full count of 64, the terminal 4 of the counter is grounded to prevent application of signal from the oscillator 48 to the controlling base of the transistor switch 94. When the count is complete and until the counter 33 is again reset, terminal 4 is ungrounded for applying signal from the oscillator 48 to cause interruptions in the conductivity of the transistor 94. The collector circuit of the transistor 94 includes the primary winding of a transformer 95, and interruption of current through the transformer 95 connected to the thyristor 28 provides "picket-fence" firing for maintaining the thyristor 28 conductive as long as the firing voltage is present and the required polarity is across the thyristor. The resetting voltage for phase one is derived from the transformer 37 connected between the lines 20 and 22, the lines being for phase 1 and phase 3 respectively. To obtain in the resetting circuit, the delay described above, phase is changed 180 degrees by the connections of the secondary winding of the transformer 37, and additional delay is provided by the subsequent resistors 95 and 96 and capacitors 97 and 98 for application to the input of an amplifier 99. The output of the amplifier 99 is connected to the resetting terminal 11 of the timing counter 33.

As the motor 27 is being accelerated from OFF to forward-low, the frequency of the output of the voltage-controlled oscillator 48 is decreased when the motor tends to accelerate faster than the rate commanded by the ramp, and conversely is increased when the rate of acceleration is smaller than that commanded by the ramp. Obviously, if the frequency is increased, the timing counter 33 reaches its full count sooner for starting the firing of the thyristors 28. In a preferred embodiment controlling a motor 27 that has a full low speed of 1800 rpm, the motor while under control of the ramp obtains full speed 0.6 second after starting, and then after 0.8 second, the contacts 63a (FIG. 2) controlling the bypass contactor 30 close for bypassing the thyristors.

With reference to the voltage dividing circuit shown in FIG. 3 for controlling voltages of the ramp, contacts 64a of the bypass contactor close at the end of the 0.8-second interval for applying ground to the control circuit of the FET gate 70, and the gate is opened to remove the voltage supplied by the voltage divider including resistors 68 and 69 from the input of the ramp 38. Since the motor 27 has reached full selected speed, dependent somewhat on its load, voltage derived from the tachometer 39 for application through the high-resistance resistor 71 is now substantially equal to the ending voltage that was being applied from the junction of the resistors 68 and 69 at the time that the gate 70 was opened. Therefore, the voltage at the input of the ramp 38 changes little and continues to be held at the voltage determined exactly by the speed of the motor 27 during bypass while the motors are being operated directly from the line (FIG. 4) through contactors 30, 25, and 26. Regardless of the duration of the operation of the motor 27 at low speed, the voltage applied to the input of the ramp generator 38 will be available as an exact starting voltage for smooth transition at the beginning of either subsequent acceleration or deceleration. During this first mode of operation being described, the operation of relays for controlling brakes and for ensuring full operation are not fully described but are described below with reference to the selected modes in which they become most effective.

Should the selective operational switching control 42 be operated from forward-low to forward-high within about 1.0 second before the bypass contactor 30 has had time to operate and likely before the motor 27 has reached full low-speed, delay circuits function to retain the control circuits of the motor 27 in the low-speed mode until completion and then switch automatically to the high-speed mode as described below. Presently, the selective operational switch control 42 has been operated normally to its low-speed position for at least 1.0 second before being operated to its high-speed position; and the section 54 of the selective operational switching control 42 disconnects immediately the winding 60 of the low-speed contactor 26a; and operation of the section 55 prepares the circuit of the winding 59 of the high-speed contactor 26b. The section 52 closes again immediately the winding of the forward delay relay 58, and the relay 58 immediately closes the contacts 58b for closing the circuit of the winding 62 for again operating immediately the forward contactor 25a. Operation of the forward delay relay 58 also closes instantly the contacts 58a that is in series with the section 55 of the control 42 for maintaining closed the circuit for the winding 59 of the high-speed contactor 26b.

Substantially simultaneously with the operation of the forward contactor 25a and the high-speed contactor 26b, contacts of the contactors and the relays as described above have operated in a similar manner for selecting the required beginning voltage for the ramp, for determining the required polarity of the error-signal, and for operating the bypass contactor 30 for 0.8 second. Also, contacts 101a of a brake delay relay 101 in parallel with the contacts 58a of the forward delay relay 58 and in series with sections 54 and 55 of control switch 42 are maintained closed during the transition, and contacts in a circuit of a brake contactor 100 close during the transition to prevent application of mechanical brakes as described more fully below. The circuit for the winding of the relay 101 is completed through either contacts 59c controlled by the winding 59 of the high-speed contactor 26b or contacts 60c controlled by the winding 60 of the low-speed contactor 26a in series with either one of contacts 61d controlled by the winding 61 of the reverse contactor 25b or contacts 62d controlled by the winding 62 of the forward contactor 25a. During acceleration to forward-low speed, the contacts 60c and 62d were closed for energizing the winding of the relay 101. Release of the contacts 101a is delayed and therefore in addition to being closed across the contacts 58a during any bypass interval are maintained closed for 0.1 second afterward. During the 0.1-second delay, the circuit through the sections 54 and 55 of the selective operational switching control 42 is maintained closed through the contacts 101a independent of any short interruption of the operation of the contacts 58a. In response to selection of forward-high speed, the winding of the relay 101 is again energized immediately through operation of the contacts 62d and the contacts 59c.

The forward relay 57 in parallel with the forward delay relay 58 is operated to close again contacts 57b in the voltage divider circuit (FIG. 3), and contacts 59d are operated by the winding 59 of the high-speed contactor 26b to remove a short circuit from across a resistor 102, positive 7.5 volts then being applied through the resistor 102 to the resistor 69 of the voltage divider to raise the ending voltage for the ramp 38 from 9.9 volts to 12.45 volts. At the beginning of the period of accelerating to high speed, the input to the ramp 38 was approximately 9.9 volts derived from the circuit connected to the tachometer 39. To apply the ending voltage, the control circuit of the FET gate 70 is closed by operation of the contacts 64a when the bypass contactor 30 is operated.

In the circuit for controlling polarity connected to the FET gate 66, the contacts 65a remain operated during acceleration to high-speed and the series contacts 62c are operated simultaneously with the operation of forward contactor 25a. Therefore, again the control circuit of the gate 66 is grounded, and the inverting amplifier 67 is short-circuited to be ineffective.

During acceleration to low speed, the bypass control relay 63 was maintained de-energized by the opening of the contacts 60b and 62b in its control circuit. Since contacts 60b are closed by the deenergization of the winding 60 of the low-speed contactor 26a before the series contacts 59b are opened by energization of the winding 59 of the high-speed contactor 26b, the bypass control relay 63 is energized, and the contacts 63a are opened and will remain open 0.8 second after the immediate reenergization of the bypass control relay 63. As described above, the opening of the bypass contractor 30 in response to the opening of the contacts 63a also opens contacts 64a in the control circuit of the FET gate 70 for applying ending voltage to the ramp generator 38.

During the preceding mode of operation while the motor 27 was being accelerated to low speed, the bypass control relay 63 was maintained de-energized by the normally closed contacts 60b and 62b being open in its control circuit. Since contacts 60b are closed by the de-energization of the winding 60 of the low-speed contactor 26a before the series contacts 59b are opened by energization of the winding 59 of the high-speed contactor 26b, the bypass control relay 63 is energized and the contacts 63a are opened and will remain open 0.8 second after the immediate re-energization of the bypass control relay 63. As described above, the opening of the bypass contactor 30 in response to the opening of the contacts 63a also opens contacts 64a in the control circuit of the FET gate 70 for applying ending voltage to the ramp generator 38.

When the winding 59 of the high-speed contactor 26b was energized, the winding of a high-speed relay 103 connected in parallel was also energized. Energization of the winding operated immediately contacts 103a connected in series with contacts 57a in the circuit for operating the bypass contactor 30. Since the contacts 57a had been operated by the winding of forward relay 57 connected in parallel with the forward delay relay 58, the operating circuit for the bypass contactor 30 has been prepared for energization in response to closure of the contacts 63a at the termination of the 0.8 second interval started by interruption of the operating circuit of the bypass control relay 63. The motor 27 is now operated from current applied directly through the bypass contactor 30 until the selective operational switching control 42 is again operated.

In response to the operation of the selective operational switching control 42 to the position for low speed and providing at least 1.0 second has elapsed since the high-speed mode was selected, the switching control circuits 41 (FIGS. 1 and 2) operate immediately to provide regenerative braking for slowing the motor 27 to low speed. The section 55 of the selective switch 42 opens the circuit of the winding 59 of the high-speed contactor 26b and of the parallel winding of a high-speed relay 103. Section 54 of the switch 42 completes the circuit of the winding 60 of the low-speed contactor 26a through parallel contacts 58a and contacts 101a of brake delay relay 101, the contacts 101a maintaining the circuit during a short interruption of the contacts 58a.

Section 52 of the selective switch 42 completes the circuit for operating the forward relay 57 and the forward delay relay 58. The contacts 58b of the relay 58 are reoperated to operate forward contactor 25a. To maintain the 0.1-second-delay contacts 101a operated, the winding of the brake delay relay 101 is reenergized through contacts 62d operated by the winding 62 of the forward contactor 25a and through contacts 60c operated by the winding 60 of the low-speed contactor 26a.

During the preceding high-speed operation, the bypass control relay 63 continues to be released and its normally closed, timed contacts 63a closed by maintaining open the normally closed contacts 59b and 62b through operation of the windings 59 and 62 respectively. Since the contacts 59b close again by deenergization of the winding 59 before the energization of the winding 60 for opening the contacts 60b, the bypass control relay 63 is momentarily energized for opening the contacts 63a for starting an 0.8 second interval in which the bypass contactor 30 is released. As indicated above, since each of the contacts controlled by either one of windings 59 and 60 is in the operating circuit of the other winding, one winding must be deenergized before the other can be energized.

With reference to the voltage divider of FIG. 3, contacts 59d across the resistor 102 were closed in response to the deenergization of the winding 59, and the contacts 57b are again closed by the reoperation of the forward relay 57. Again the contacts 64a are closed for applying an ending voltage of 9.9 volts to the input of the ramp generator 38. As described above, the beginning voltage from the tachometer 39 is dependent upon the speed of the motor, and for high speed is approximately 12.45 volts.

Whereas in the forward accelerating modes, the control circuit of the FET gate 66 is grounded, the circuit is ungrounded during regenerative braking to permit bias to be applied to the gate 66. Therefore the FET gate 66 is conductive for short-circuiting the inverting amplifier stage 67 to prevent inverting. Whereas during acceleration, longer firing intervals of the thyristors 28 caused greater acceleration, now while the speed of the motor 27 is faster than the low-speed, longer firing intervals increase the braking applied to the motor 27. That is, for a certain deviation from the speed commanded by the ramp, the control voltage applied to the voltage-controlled oscillator 48 is changed in an opposite direction for braking from the direction for acceleration. During forward acceleration, as described previously, ground is applied through the contacts 62c operated by the winding 62 of the forward contactor and through either the normally closed contacts 65a of unoperated high delay relay 65 during acceleration to low speed or through operated contacts 103a of the high-speed relay 103 during acceleration to high speed. During regenerative braking for slowing from forward high speed, the high-speed relay 103 having its winding in parallel with the winding 59 of the high-speed contactor is released to open the contacts 103a immediately. The winding of high-delay relay 65 is closed through the slow-release contacts 103c of the relay 103. During 1.0 second after deenergization of the relay 103, the contacts 103c remain closed for maintaining the normally closed contact 65a in the polarity control circuit open during the subsequent period of regenerative braking.

During regenerative braking the gain of the first inverting amplifier stage 85 is decreased by shunting the stage with the resistor 90 connected through the conductive FET gate 91. Both the contacts 103b and 65c in the controlling circuit for the gate 91 are open to permit application of bias required to close the gate 91. The decreased gain during regenerative braking is required because a certain amount of change in current through the thyristors cause a greater change in the speed of the motor 27. The contacts 103b opened immediately in response to the deenergization of the relay 103 when selection was changed from high speed, and the relay 65 remained operated for 1.0 second for maintaining the contacts 65c open, the contacts 103c of the relay 103 remaining closed for 1.0 second after deenergization of the relay 103. During previous acceleration to low speed, the relay 65 was unoperated for connecting ground through the contacts 103b to the controlling circuit of the FET gate 91, and during previous acceleration to high speed, the relay 103 is energized to close the contacts 103b.

Again the ramp has reached its ending voltage within about 0.6 second, and the contacts 63a of the bypass control relay 63 close at 0.8 second to operate the bypass contactor 30. The contacts 103c of the high-speed relay 103 open after 1.0 second to release the high delay relay 65. The release of delay 65 opens contacts 65a and closes contacts 65b in the polarity controlling circuit and closes the contacts 65c in the gain control circuit of the amplifier 85. The motor 27 continues to operate at its low speed until commanded to change speed by the switching control 41.

In response to the operation of the selective operational switching control 42 from forward low to OFF, the forward contactor 25a is released and the reverse contactor 25b is operated for plug-reverse braking. The operating circuit of the winding 61 for operating the reverse contactor 25b is closed for reverse braking by immediate release of contacts 58c and delayed opening of contacts 58d of the forward delay relay 58.

In detail, in response to operation of the section 54 of the selective operational switching control 42 to OFF, the circuit for winding 60 of the low-speed contactor 26a is again operated through the contacts of the section 54. The section 52 of the switch opens the operating circuit of the forward relay 57 and the forward delay relay 58. The operation of the relay 58 immediately opens contacts 58b for opening the circuit of the winding 62 of the forward contactor 25a, and immediately closes the contacts 58c in the circuit for the winding 61 of the reverse contactor 25b. The closings of the contacts 58c and the contacts 62a immediately operate the reverse contactor 25b through the series contacts 58b and contacts 104a. The series contacts 58d have been closed while the forward delay relay 58 was closed, and the contacts 58d remain closed for 1.0 second for operating the reverse contactor 25b during the timed period for plug-reverse braking. The contacts 104a are closed during forward operation of the motor 27. Relay 104 is deenergized in response to the motor 27 being braked to a stop, and the immediate opening of the contact 104a opens the reverse contactor 25b for disconnecting the windings of the motor 27.

In the input circuit of the ramp generator 38 of FIG. 3, the contact 64a during plug-reverse braking are open as usual when the bypass contactor 30 is open, and the contacts 57b, that during forward operation connected resistor 68 to positive 15 volts, are now open because of the open circuit at the switching section 52 in the operating circuit of the relay 57. Therefore, upon the opening of the contacts 64a for shunting the beginning voltage controlled by the tachometer 39, positive 7.5 volts is applied through the closed contacts 59d, the resistor 69, and the conductive gate 70 to the input of the ramp generator 38. During a 0.6-second interval, voltage at the output of the ramp generator 38 will change from approximately positive 9.9 volts corresponding to the actual speed of the motor 64 to positive 7.5 volts corresponding to zero speed.

The controlling circuit of the FET gate 66 for determining polarity of error signal is ungrounded during plug-reverse braking because in one leg of the parallel circuit contacts 65b of the high delay relay 65 are open, and in the other leg contacts 62c operated by the winding 62 of the forward contactor are open. Therefore, during-plug reverse braking in the forward direction, the amplifying stage 67 operates as an inverter. In the gain circuit of the preceding stage 85, the gate 91 is open so that the resistor 90 is not connected across the amplifying stage 85. Since the relay 65 is unoperated, the normally closed contacts 65c apply ground to the control circuit of the gate 91.

Two of the relays for timing, the bypass control relay 63 and the brake delay relay 101, are reenergized during each transition. At the beginning of the forward, reverse-braking period, contacts 61d of the reverse contactor 25b and contacts 60c of the low-speed contactor 26a are operated to operate the relay 101 for maintaining the contacts 101a operated. Also, the circuit for energizing the bypass control relay 63 is momentarily closed and then maintained open during plug-reverse braking by contacts 60b operated by the winding 60 of the low-speed contactor 26a and the parallel contacts 61b operated by the winding 61 of the reverse contactor 25b.

In the present embodiment for elevators, the brake control circuits shown at the bottom of FIG. 2 stop the motor 27 to terminate forward operation by releasing the reverse contactor 25b and by energizing winding 100 of a mechanical brake contactor. An adjustable positive-control amplifying circuit 105 senses the cessation of operation of the motor 27 for releasing the forward brake relay 104. The contacts 104a in the circuit of the winding 61 of the reverse contactor 25b open in response to the deenergization of the relay 104. The operation of the motor 27 may be sensed by a separate d-c tachometer 51, or more conveniently by the tachometer 39 of FIG. 3 connected to the amplifier 104 and an amplifier 107. The input of the amplifier 105 for positive control as well as the similar amplifier 107 for negative control is biased at positive 7.5 volts to correspond to a bias connected to the tachometer 51, the bias corresponding to zero speed. Therefore, the amplifier 104 for positive control having positive 7.5 volts and the tachometer 51 connected through a diode 106 to the input responds to voltages greater than positive 7.5 volts and likewise the amplifier 107 for negative control connected to the tachometer 51 through a diode 108 responds to voltages less than positive 7.5 volts. With reference to the voltages shown for the ramps in FIG. 3, the amplifier 105 responds to operation of the motor 27 in a forward direction and the amplifier 107 responds to operation in a reverse direction. The exact values of the biases applied to the respective inputs of the amplifiers 105 and 107 are controlled by adjusters 109 and 110 respectively. The adjustive control 109 is adjusted to open the reverse contactor 25b and to deenergize the winding 100 of a mechanical brake contactor at the precise time for obtaining a smooth stop. Obviously, if the circuit including the positive control amplifier 105 operates too late, the motor 27 will start to operate in a reverse direction.

In detail, the brake relays 104 and 111 are connected through the normally closed contacts 111d and 104d respectively of the other one of the relays to the output of the respective amplifier 105 or 107. The operating circuit of the winding 100 for the brake contactor includes slow-release contacts 101b of the brake delay relay 101, the contacts 101b being connected in series with two parallel circuits of contacts to the winding 100. The one parallel circuit of contacts includes normally open, holding contacts 100a in series with normally open contacts 104d of the forward brake relay 104 and parallel contacts 111b of the reverse brake relay 111. The other parallel circuit of contacts includes normally open, instant operating contacts 101c of the brake delay relay 101 and series, slow-operating contacts 104c and 111c of forward brake relay 104 and reverse brake relay 111 respectively. According to general practice for safety, mechanical brakes are applied when the winding 100 is deenergized.

When a selective operational switching control 42 has been operated from OFF to a low speed position and the brake delay relay 101 is operated as described above, contacts 101b and contacts 101c are both operated immediately to complete a circuit to the winding 100 through the normally closed contacts 104c and the normally closed contacts 111c of the brake relays 104 and 111 respectively. As soon as the winding 100 is energized, the holding contacts 100a are closed in series with one set of the contacts 104b and contacts 111b of the respective brake relays. Either the contacts for the forward direction or the reverse direction are soon operated in response to operation of one of the relays to complete the operating circuit of winding 100 through its holding contacts 100a. During the transitions between speeds the contacts 101b are maintained closed, and rotation of the motor 27 is sensed to maintain either one of the sets of the contacts 104*b* or 111*b* closed. The slow-operating contacts 104*c* and 111*c* open shortly after starting, for example, approximately 0.1 second, so that the circuit for winding 100 is opened instantly at either of the contacts 104*b* or contacts 111*b* by release of either the operated brake relay 104 or 111.

Summarizing the operation of the brakes in response to the selection of OFF, when the selected ramp has reached a voltage of positive 7.5 volts, the motor 27 is stopped, and when the motor has been operating in a forward direction, the forward brake relay 104 is released to open contacts 104*a* for releasing the reverse contactor 25*b* and to open contacts 104*b* for opening the circuit of winding 100 for applying mechanical brakes. During trial operations the operating point of the positive control amplifier 105 has been adjusted by the adjustive control 109 to provide the smoothest stops.

After the motor 27 is stopped, delay relay contacts open and all contactors and relays are released in preparation for subsequent selected operations. The contacts 63*a* of the bypass control relay 63 close, but the circuit for the winding 64 of the bypass contactor 30 remains open because in its operating circuit the other contacts are operated only during selection of speed and direction. Shortly after contacts 63*a* are released, contacts 101*a* of the brake delay relay 101 open for deenergizing the winding 60 of the low-speed contactor 26*a*. The contacts 58*a* of the forward delay relay 58 has previously been opened by the release of relay 58 at the beginning of the period for plug-reverse braking.

When the present manual control is used, an operator could by operation of the selective operational switching control 42 select high-speed within 1.0 second after low-speed has been selected. In that event, the low-speed holding relay 112 in cooperation with the high delay relay 65 operates to maintain closed for 1.0 second after selection of low speed the circuit for operating the low-speed contactor 26*a* and retains open until the end of this same period the circuit to the winding 59 of the high-speed contactor 26*b*. The operating circuit of the low-speed holding relay 112 includes fast and slow operating contacts 103*d* and 103*e* respectively connected in parallel with each other and both in series with the contacts 101*a* of the brake delay relay 101, the contacts 101*a* also being in parallel with the contacts 58*a* of forward delay relay 58 as well as other contacts 56*a* corresponding to the contacts 58*a* effective during reverse direction of operation. Immediately after forward-low had been selected, the contacts 58*a* and then the parallel contacts 101*a* have been operated in series with the normally closed parallel contacts 103*d* and 103*e* of the released high-speed relay 103 to complete the operating circuit of the relay 112. Before the energization of the winding of the relay 112, slow-operating contacts 112*a* in series with the winding 59 of the high-speed contactor 26*b* are normally open and remain open for 1.0 second after the energization of the winding 112 to prevent the operation of the high-speed contactor 26*b* until after acceleration to low-speed has been completed. Contacts 112*b* of the relay 112 are normally closed and remain closed for 1.0 second after the energization of the winding of the relay 112 to continue providing a shunt across the section 54 of the selective operational switching control 42, the section 54 having been opened for continuing to retain operated the low-speed contactor 26*a* until full low-speed has been attained.

After the contacts of the relay 112 have been actuated, the circuits for high speed as described above are completed including their operation for interrupting the circuits of the brake delay relay 101 and the bypass control relay 63. Through the interruption of these circuits, mechanical brakes are retained unoperated during the transition from low-speed to high-speed, and the contacts 63*a* in series with the closed contacts 103*a* and contacts 57*a* are opened to retain the bypass contactor 30 open as usual for the 0.8 second interval. At the end of the 1.0-second interval when the contacts 112*a* of the low-speed holding relay 112 open the circuit of the winding 59, the parallel circuit for the high-speed relay 103 is also opened, and the relay 103 releases to restore the contacts 103*e* and 103*d* to their normal positions.

Delayed actuation of relay contacts also prevents the application of plug-reverse braking until completion of the regenerative braking. To retain regenerative braking, the forward contactor 25*a* is retained operated for 1.0 second after the circuit for operating the high-speed contactor 26*b* has been opened at the section 55 of the selective switch 42. The section 55 also opens the circuit of the high-speed relay 103, but its contacts 103*c* stay closed for 1.0 second after deenergization to retain the high delay relay 65 energized. Therefore, contacts 65*d*, one of two sets of contacts in series across the section 52 of the switch 42, remain closed for 1.0 second and the other set of contacts 57*c* function as holding contacts retained operated by the forward relay 57. The forward delay relay 58 is retained closed to maintain the forward contactor 25*a* closed as described above for forward acceleration. In the circuit for operating the reverse contactor 25*b*, both contacts 62*a* and 58*c* are opened by the energization of winding 62 of the forward contactor and the operation of the forward delay relay 58 respectively. The timing intervals for prevention of the application of mechanical brakes and for maintaining the bypass contactor 30 open are started in the usual manner during transition. In the circuit for operating the bypass control relay 63, the contacts 59*b* controlled by the winding 59 of the high-speed contactor 26*b* are closed before the contacts 60*b* controlled by the winding 60 of the low-speed contactor are closed. The momentary energization of the bypass control relay 63 starts the 0.8-second interval of control by the thyristors. In the operating circuit of the brake delay relay 101, the contacts 60*c* are operated by the winding 60 of the low-speed contactor immediately after the contacts 59*c* are opened by the de-energization of the winding 59 of the high-speed contactor, and therefore the slow releasing contacts 101*a* and 101*b* remain closed as usual during transition. Circuits for determining the voltages applied to the ramp generator 39 and the circuits for determining polarity and sensitivity of the error circuits 47 are controlled as described above for regenerative braking.

To terminate regenerative braking retained after early selection of slow-speed, the high delay relay 65 is released 1.0 second after the de-energization of the high-speed relay 103 to open the contacts 65*d* in the operating circuit of the forward relay 57 and the forward delay relay 58. The release of the relay 58 opens the contacts 58*b* for opening the forward contactor 25*a*. The operating circuit for the reverse contactor 25*b* includes normally closed, fast acting contacts 58*c* and operated contacts 58*d* that are retained closed for 1.0 second after the de-energization of the winding of the relay 58. The circuit for operating the reverse contactor 25b also includes connected in series normally open contacts 104a of the forward brake relay 104 and the normally closed contacts 62a of the forward contactor 25a. As long as the motor 27 is operating in the forward direction, the contacts 104a are closed, and since the forward contactor 25a has been released, the contacts 62a are also closed for completing the circuit through the slow-releasing contacts 58d for the winding 61 of the reverse contactor 25b. The operating circuit of the low-speed contactor 26a is still closed through the contacts 101a, the section 54 of the switch 42, and the normally closed contacts 59a controlled by the winding 59 of the high-speed contactor. In the usual manner, the bypass contactor 30 is retained open for 0.8 second by the closure of the contacts 62b of the forward contactor before the opening of the contacts 61b by the winding 61 of the reverse contactor 25b. For operating the brake delay relay 101, the contacts 61d operated by the winding 61 of the reverse contactor 25b complete an operating circuit through the operated contacts 60c for maintaining the contacts of the brake delay relay 101 closed until shortly after the release of the reverse contactor 25b.

The circuits for determining voltage to be applied to the input of the ramp generator 38, determining the sensitivity of the error circuit 47, and the polarity of the error signal are controlled as described above for plug-reverse braking. Also as described above, when the tachometer 51 senses the cessation of operation of the motor 27, the forward brake relay 104 is released. The contacts 104a of the forward brake relay are opened for opening the reverse contactor 25b to open the windings of the motor 27. In response to the release of the forward brake relay 104, mechanical brakes controlled by the winding 100 are operated as described above. The contacts of the brake delay relay 101 open, and all relays and contactors are de-energized in preparation for subsequent operation.

The description for operation of the motor 27 in an opposite or reverse direction is mostly similar to the operation in the forward direction as described. With reference to FIG. 2, in the switching positions for the corresponding speeds in the opposite direction of operation, the circuits selected by the sections 54 and 55 of the selective operational switching circuit 42 are identical, and the circuits selected by section 53 are similar to the circuits selected by the section 52. In FIG. 2, for operation in the reverse direction, reverse relay 113 corresponds to the forward relay 57 used in the forward direction, and reverse delay relay 56 corresponds to the forward delay relay 58. The contacts 56a of the reverse delay relay 56 are in parallel with the contacts 58a in the circuit of the winding 60 of the low-speed contactor 26a, and during reverse operation perform the same function performed by the contacts 58a during forward operation.

With reference to FIG. 3, curves of the ramps for reverse operation have a negative slope rather than a positive slope, and for corresponding operations in opposite directions, the FET gate 66 is operated to an opposite state for determining an opposite polarity of error signal. In the input circuit for the ramp generator 38, contacts 113b rather than the contacts 57b are operated during the reverse direction of operation.

In the circuit for determining polarity of error signal as shown in FIG. 3, the state of operation of the gate 66 is opposite for each of the corresponding selections in the forward direction. During the two positions for reverse acceleration, rather than contacts 62c being operated, the contacts 61c are operated with the reverse contactor 61, but one or other of the contacts in series with 61c are open to prevent the application of ground to the control circuit of the gate 66. While accelerating to the low speed, contacts 65b are open, and while accelerating to the high speed, contacts 103f are open. During a subsequent interval of regenerative braking in response to the selection of reverse low, the contacts 61c are again closed; also the contacts 103f of the high-speed relay 103 are closed instantly in response to the release of the relay 103; and the contacts 65b are retained closed by the slow operating contacts 103c to provide inverting until the termination of the interval for regenerative braking. During the interval for plug-reverse braking in response to the selection of OFF, contacts 61c have been opened, and the contacts 62c are operated by the winding 62 of the forward contactor. Since the high delay relay 65 is unoperated, the normally closed contacts 65a in series with the contacts 62c are operated for grounding the control circuit of the gate 66 for permitting the amplifier stage 67 to invert.

Ground is removed from the control circuit of the gate 91 to decrease the gain of the preceding amplifier stage 85 when parallel contacts 103b of the high-speed relay 103 and the normally closed contacts 65c of the high delay relay 65 are both open. Since these contacts are controlled by the circuit for controlling the high-speed contactor 26b, as for the forward direction, the contacts are both open only during the period for regenerative braking resulting from the selection of reverse-low.

The full-on circuit of FIG. 5 is enabled to ensure full selected speed of the motor 27 at the end of each period of control by the thyristors but is disabled during plug-reverse braking in response to selection of OFF for stopping. When the end of a control ramp other than the 7.5-volt end for stopping is reached, the full-on circuit is effective to ensure that the thyristors corresponding to the thyristor 28 are conductive for the maximum intervals provided by the range of control of the voltage-controlled oscillator 48. As shown in FIG. 3, the negative input of the error signal amplifier 47 has with respect to ground a positive bias applied through resistors connected to positive 15 volts. During the intervals of control by ramps, a typical bias voltage may be positive 1.3 volts. As described above with reference to FIG. 4, as the frequency of the output of the voltage-controlled oscillator 48 becomes higher, the timing counter 33 will be filled quicker for shortening the nonconductive periods of the thyristors 28 and therefore for increasing the periods of conductivity of the thyristors. The frequency of the voltage-controlled oscillator 48 is increased in response to its input as derived from the output of the amplifier 92 changing in a positive direction. The output of the amplifier 92 changes in a positive direction in response to the positive input of the amplifier 92 becomming less positive so as to decrease the difference in voltages applied to the inputs of the amplifier 92. In response to the selection of a speed but delayed until after completion of the ramps for controlling either acceleration or regenerative braking, the full-on circuit of FIG. 5 applies ground through a low resistive circuit to the negative terminal of the amplifier 92 for reducing the bias nearly to ground. The application of ground decreases the difference in voltage between the inputs of the amplifier 92 for increasing the frequency of the output of the voltage-controlled oscillator 48 to its maximun frequency.

In FIG. 5 the grounding circuit for maintaining the frequency maximum can be traced from the negative input of the amplifier 92 through the collector-emitter circuits of either one of the transistors 114 or 115 to ground at the output of the differential amplifier or comparator 116. This ground at the output of the amplifier 116 is removed for the duration of each of the segments of the ramp, and is reapplied approximately 0.2 second after the end of each of the segments. Since the motor 27 is to be stopped at the ends of the intervals for plug-reverse braking and the thyristors corresponding to the thyristor 28 ought not be fully on for stopping, the transistors 114 and 115 function as gates to disconnect ground during those segments of ramp for controlling plug-reverse braking but function to connect ground at the ends of other segments. The base of each of the transistors 114 and 115 is connected to a bias circuit for applying positive bias to the respective base for preparing the transistors 114 and 115 for conduction. The outputs of differential comparators 117 and 118 are also connected to the bias circuits for the transistors 114 and 115 respectively, and both of the outputs during selection of a speed resulting in either acceleration or regenerative braking are grounded and, since both of the transistors 114 and 115 are nonconductive, prevents application of ground from the output of the amplifier 116 to the bias circuit of the amplifier 92.

The positive input of the amplifier 117 is connected through an isolating resistor to the contacts 57b of the forward relay 57, and the negative input of the transistor 118 is connected through an isolating resistor to the contacts 113b of the reverse relay 113, the contacts 57b and 113b being the contacts in the circuit of the voltage divider of FIG. 3 for applying ending voltages to the input of the ramp generator 38. When both the contacts 57b and 113b are unoperated, +7.5 volts is applied through the voltage divider to the positive input of the amplifier 117 and to the negative input of the amplifier 118. The negative input of the amplifier 117 is connected to a voltage divider circuit for applying voltage greater than the positive 7.5 volts, and the positive input of the amplifier 118 is connected to the divider for applying voltage less than positive 7.5 volts. While both the contacts 57b and the contacts 113b are open, the input stages of the amplifiers 117 and 118 are non-conductive but each of the amplifiers have a second stage that functions in an inverting manner to apply ground at the output. The ground at each of the outputs of the transistors 117 and 118 ground the bases of the respective transistors 118 and 115 to prevent them from conducting.

As described above, for forward operation except for plug-reverse braking, the contacts 57b are closed, and when these contacts are closed positive 15 volts is applied to the positive input of the amplifier 117. The input of the amplifier 117 becomes conductive but the output circuit becomes nonconductive to remove ground from the base of the transistor 114. The transistor 114 is therefore prepared during forward operation except during plug-reverse braking for conducting ground when it is made available at the output of the amplifier 116. Likewise, in the reverse direction except during plug-reverse braking, the contacts 113b are closed, and ground is removed from the base of the transistor 115 in preparation for conduction of ground when available from the output of the amplifier 116.

Binary logic circuits controlled by the input stage 72 of the ramp generator 38 of FIG. 3 for determining application of ground at the output of the amplifier 116 include differential amplifiers 119 and 120 having respective inputs connected to the output of the amplifier 72. During forward direction when segments of the ramp have voltages greater than positive 7.5 volts, the output of the amplifier 72 approaches positive 15 volts from the beginning to the end of the ramp; during the segments for reverse operation, the voltage at the output of the amplifier 72 approaches ground or zero volts until the end of the ramp. The output of the amplifier 72 is connected through a diode 121 to the negative input of the amplifier 120 and is connected through a diode 122 to the positive input of the amplifier 119. Positive 7.5 volts bias is also applied to the positive input of the amplifier 119 and to the negative input of the amplifier 120. The negative input of the amplifier 119 is connected to a voltage divider for applying approximately positive 5 volts, and the positive input of the amplifier 120 is connected to the voltage divider for applying approximately 10 volts. Since the diodes 121 and 122 are normally non-conductive, the inputs of the amplifiers 119 and 120 are normally conductive, but these amplifiers also have a succeeding inverting stage so that the outputs are normally open.

The outputs of the transistors 119 and 120 are connected through a resistor 123 and the diode 124 connected in parallel in delay circuit, to the negative input of the amplifier 116 that normally applies ground through the gating transistors 114 and 115 to the amplifier 92 of the error signal circuit. The delay circuit also includes a capacitor 125 connected between ground and the negative input of the amplifier 116. The outputs of the amplifiers 119 and 120 are also connected through a resistor 126 to positive 15 volts.

Normally, shortly after the termination of a segment of a ramp and until the beginning of a succeeding segment while the instantaneous voltage of the ramp is substantially the same as the ending voltage for the ramp, positive 15 volts is applied to the negative input of the amplifier 116, and since the positive input of the amplifier 116 is connected to a voltage divider for applying approximately positive 15 volts, an input section of the amplifier 116 is non-conductive. The amplifier 116 has an output circuit that is conductive for applying ground to the emitters of the gating transistors 114 and 115. During forward operation except during plug-reverse braking, the contacts 57b for controlling the amplifier 117 are closed and the transistor 114 is conductive for applying ground from the output of the amplifier 116 through the transistor 114 to bias the input of the amplifier 92 for full-on operation. Likewise during reverse operation the contacts 113b are closed to permit the transistor 115 to conduct.

When one of the more positive segments of the ramp for forward operation is selected, voltage at the output of the high-gain amplifier 72 immediately approaches positive 15 volts, and any voltage over approximately positive 10 volts applied through the diode 121 causes the input section of the amplifier 120 to become nonconductive and its output conductive for applying ground through the resistor 123 and the parallel diode 124 connected in series with the capacitor 125. The diode 124 is connected with proper polarity to discharge the capacitor 125 instantly for grounding the negative input of the amplifier 116. Since the amplifier 116 has an inverting stage, the output circuit removes ground from the emitters of the transistors 114 and 115, and therefore from the input of the amplifier 92 of the error signal circuit. The amplifier 92 then responds to error voltage for controlling the acceleration or regenerative braking in a forward direction. At the end of the segment of the ramp when voltage applied to the negative input of the amplifier 120 becomes less than approximately positive 10 volts, the amplifier 120 responds to remove ground from the diode 124. The value of the capacitor 125 and the value of the resistor 123 have been selected such that after ground is removed at the output of the amplifier 120, approximately 0.2 second is required to charge the capacitor 125 to the voltage greater than approximately 10 volts.

The application of voltage greater than approximately 10 volts to the negative input of the amplifier 116 again applies ground to the emitters of the transistors 114 and 115. As described above, the ground is effective at the ends of segments of ramps except those segments for plug-reverse braking to cause maximum intervals of firing of the thyristors.

For reverse operation when the voltage applied to the input of the full-on circuit from the amplifier 72 is less than positive 7.5 volts, the diode 122 is conductive, and while the voltage is less than approximately positive 5 volts, an input section of the amplifier 119 becomes non-conductive and the output of the amplifier 119 is grounded. As during forward operation, ground is removed for the duration of the segments of the ramp from the output of the amplifier 116 for permitting control by the error signal applied from the error signal circuit 47.

The several features of this invention may be used individually or in combination. For example, if only smooth starting is required for induction motors that have high torque, the phase-shift circuits 36 may be incorporated in resetting circuits. By the addition of the bypass contactor 30 and required timing relays or circuits for control thereof, thyristor circuits that are rated to carry less continuous current can be used and greater reliability will be attained. Starting and stopping of single speed motors can be attained through the use of the phase-shift circuits 36, control circuits for plug-reverse braking, and sensing circuits such as those including the tachometer 51 of FIG. 2 for disconnecting motors, with or without mechanical braking.

I claim:

1. A motor controller having improved firing means, a high-torque, two-speed, three-phase induction motor, thyristor means, said motor being connected to a three-phase power line through said thyristor means, said improved firing means controlling phases of firing said thyristor means, said motor controlling speed of a wide range of loads having torque in either forward or reverse direction with respect to the direction of running of said motor, said firing means including a firing circuit for developing ignition voltage, a ramp control means for developing a curve of voltage corresponding to a desired speed, a tachometer connected to said motor for developing a voltage proportional to actual speed, and a comparator having an output supplying the difference between said voltages for said desired speed and said actual speed, control switching means responsive to a stop command for connecting said motor to said thyristor means successively for regenerative and for reverse-running braking, firing timing means connected between said output of said comparator and said firing circuit for each phase of said power line to control times of firing, resetting means for each phase connected between said power line and said firing timing means, the improvement comprising a phase-shift circuit connecting each of said resetting means to a respective phase of said power line, each of said phase shift circuits delaying resetting of said firing timing means for a substantial portion of each one-half cycle occurring after respective alternate zero crossings of the respective phase of said power line, said alternate zero crossings being the zero crossings terminating those one-half cycles during which said thyristor means usually provides the greater amount of operating current while said motor is running, the delaying of each of said resettings permitting the initiation of firing even within the respective one-half cycles immediately following said alternate zero crossings such that only current that lags is conducted through said thyristor means and is controlled by said firing timing means in intervals of short enough duration to ensure smooth stopping of loads by reverse-running braking precisely at predetermined locations and also to ensure smooth starting of even those loads having torque in the direction of the running of said motor.

2. In a motor controlling circuit as claimed in claim 1, switching means operated in response to said tachometer sensing zero speed at the end of said reverse-running braking to disconnect said motor from said thyristor means and therefore from said power line, a mechanical brake only for retaining said motor stopped, amplifier means having a first output control circuit controlling said switching means and a second output control circuit connected to said mechanical brake, said amplifying means having an input connected to said tachometer, said amplifying means in response to said tachometer sensing said zero speed actuating said first output control circuit for disconnecting said motor from said power line and actuating said second output circuit for applying said mechanical brake to said motor, and said amplifier means having fine adjustment means for determining precisely the time of actuation of said first and said second output control circuits.

3. In a motor controlling circuit as claimed in claim 1 wherein said firing timing means includes a counter and a voltage controlled oscillator, said comparator having an output providing a d-c error signal as a function of the difference between voltages derived from said ramp control means and said tachometer, said voltage-controlled oscillator having an output connected to said counter and having an input circuit to which said d-c error signal is applied from said output of said comparator for controlling the frequency of said voltage-controlled oscillator, said counter providing an output in response to reaching a predetermined count at a time determined by the frequency of said voltage-controlled oscillator, said output of said counter initiating firing of said thyristor means, and said phase shift circuit and said resetting means resetting said counter at the end of said substantial portion of each one-half cycle following said respective alternate zero crossings.

* * * * *